(12) United States Patent
Guiller et al.

(10) Patent No.: US 7,186,437 B2
(45) Date of Patent: Mar. 6, 2007

(54) APPETIZING FACTOR AND TASTE ENHANCER

(75) Inventors: Isabelle Guiller, Le Tour du Parc (FR); Anne-Sophie Le Bouquin, Saint Ave (FR)

(73) Assignee: Diana Ingredients, Saint Nolff (FR)

( * ) Notice: Subject to any disclaimer, the term of this patent is extended or adjusted under 35 U.S.C. 154(b) by 0 days.

(21) Appl. No.: 10/494,708

(22) PCT Filed: Nov. 7, 2002

(86) PCT No.: PCT/FR02/03820

§ 371 (c)(1),
(2), (4) Date: Aug. 4, 2004

(87) PCT Pub. No.: WO03/039267

PCT Pub. Date: May 15, 2003

(65) Prior Publication Data

US 2004/0247741 A1  Dec. 9, 2004

(30) Foreign Application Priority Data

Nov. 7, 2001 (FR) .................................. 01 14387

(51) Int. Cl.
*A23K 1/18* (2006.01)
(52) U.S. Cl. .............. 426/656; 426/641; 426/657; 426/658; 426/549; 426/805
(58) Field of Classification Search ................ 426/656, 426/658, 641, 657, 549, 805
See application file for complete search history.

(56) References Cited

U.S. PATENT DOCUMENTS

| | | | |
|---|---|---|---|
| 3,679,429 A | * 7/1972 | Mohrman et al. | 426/93 |
| 3,930,031 A | * 12/1975 | Kealy | 426/89 |
| 5,011,679 A | 4/1991 | Spanier et al. | 424/57 |
| 5,015,485 A | * 5/1991 | Scaglione et al. | 426/94 |
| 5,532,010 A | 7/1996 | Spanier et al. | 426/94 |
| 6,254,920 B1 | * 7/2001 | Brunner | 426/656 |

FOREIGN PATENT DOCUMENTS

| | | | |
|---|---|---|---|
| SU | 1551322 | * | 3/1990 |
| SU | 1253567 | * | 8/1996 |
| WO | WO 92/03931 A | | 3/1992 |
| WO | 9528854 | * | 11/1995 |
| WO | WO 00/30456 A | | 6/2000 |

OTHER PUBLICATIONS

Kirk-Othmer Encyclopedia of Chemical Technology 2nd edition vol. 15 pp. 231-276 (1969).*
Database WPI, Section Ch, Wee 198716, Derwent Publications Ltd., Aug. 30, 1986.
Database WPI, Section Ch, Week, 199042, Derwent Publications Ltd., Mar. 23, 1990.

* cited by examiner

*Primary Examiner*—C. Sayala
(74) *Attorney, Agent, or Firm*—Birch, Stewart, Kolasch & Birch, LLP

(57) ABSTRACT

The invention concerns a novel appetizing agent containing trisodium pyrophosphate combine with a flavour and a taste enhancer, for dry or semi-dry foods for domestic animals, and a method for enhancing appetence of said foods. The invention also concerns a method for increasing and enhancing the taste of flavours and other factors of taste present in domestic animal foods.

11 Claims, No Drawings

APPETIZING FACTOR AND TASTE ENHANCER

The present invention relates to a novel appetizing agent for dry or semi-dry food for domestic animals, and to a method for improving the appetence of this food. The invention also relates to a method for increasing and enhancing the taste of the flavourings and other taste factors present in food for domestic animals.

The products currently on the market in the field of pet food generally have high nutritional qualities and may be in the form of dry, semi-dry or wet food, depending on the degree of moisture in the food.

Wet food (moisture>50%) is relatively expensive to produce and requires the use of preservatives, which are unnecessary in the case of dry food (moisture<15%) or semi-dry food (15%<moisture<50%). Moreover, food having a high moisture content generally has fewer nutritional qualities than dry or semi-dry food.

This is why manufacturers wish to manufacture such food, which food does, however, have the problem of being of less pleasant taste than wet food. It is therefore customary to add flavourings or other taste factors, so as to improve the consumption of this food by animals, and especially cats that are very difficult animals as regards food. In particular, it is known that elements based on phosphoric acid may be added to the surface of food.

It is known that adding tetrasodium pyrophosphate helps to improve the appetence of dry or semi-dry pet foods (WO 00/30456). However, this product is very hygroscopic, and therefore requires the manufacturer to work under controlled conditions when preparing dry or semi-dry food.

It is also known that disodium pyrophosphate can be used as appetizing agent in food for domestic animals (WO 92/03931). During the European proceedings, the patentees carried out comparative trials demonstrating the inactivity of trisodium pyrophosphate as appetizing agent.

However, the work of the present invention demonstrates that it is possible to use trisodium pyrophosphate as appetizing agent for dry or semi-dry food for domestic animals, in combination with a flavouring or a taste factor, and that a synergistic effect is observed between the two elements.

Thus, the present invention relates in particular to the fact that trisodium pyrophosphate makes it possible to bring out and enhance the flavourings and/or taste factors present in appetizing agents intended to be used in dry or semi-dry food for domestic animals.

The trisodium pyrophosphate of the present invention therefore has a very important role to play as taste enhancer, and is used in combination with a flavouring or a taste factor. In this embodiment, trisodium pyrophosphate is not itself a taste factor but, in combination with the added flavourings, makes it possible to increase the palatability of the food.

Thus, in a first embodiment, the invention relates to the use of trisodium pyrophosphate, in combination with a flavouring and/or a taste factor, for the preparation of an appetizing agent intended to be used in dry or semi-dry food for domestic animals. The preferred domestic animals for the implementation of the invention are cats. Trisodium pyrophosphate helps to improve the quality of the appetizing agent.

In one particular embodiment, the pyrophosphate is present in an amount from 5 to 90%, preferably 5 to 80% and more preferably 5 to 70% by weight in said appetizing agent and, after coating the pet food, the pyrophosphate is present in an amount from 0.01 to 3% by weight of the food.

The invention also relates to a method for improving the palatability of a dry or semi-dry food for domestic animals, comprising the step of applying a composition comprising trisodium pyrophosphate in combination with at least one flavouring and/or taste factor to said dry or semi-dry food.

The invention also relates to a composition (appetizing agent) for improving the palatability of a dry or semi-dry food for domestic animals, comprising trisodium pyrophosphate in combination with at least one flavouring and/or at least one taste factor.

In a preferred embodiment, the trisodium pyrophosphate is present in an amount from 5 to 90%, preferably 5 to 80% and more preferably 5 to 70% by weight in the composition.

These compositions are preferably used for implementing the methods according to the invention.

The invention also relates to a method for improving the palatability of a dry or semi-dry cat food, comprising the step of adding an appetizing agent according to the invention to said food in an amount such that the pyrophosphate is present in an amount from 0.01 to 3% by weight of the food.

As demonstrated in the examples, trisodium pyrophosphate makes it possible to enhance and bring out the flavourings present in food for domestic animals and/or in the compositions used to improve the appetence of said food. Thus, when trisodium pyro-phosphate is present in combination with a flavouring or a taste factor, a significant increase in the consumption of the food is observed compared with the same food in the absence of trisodium pyrophosphate.

Thus, the invention also relates to the use of trisodium pyrophosphate for enhancing the flavourings and/or taste factors present in an appetizing agent intended to be used in dry or semi-dry food for domestic animals, and to a method for enhancing the flavourings and/or taste factors present in an appetizing agent intended to be used in dry or semi-dry food for domestic animals, comprising the step of adding trisodium pyrophosphate, preferably in a concentration from 5 to 90%, preferably 5 to 80% and more preferably 5 to 70% by weight to said appetizing agent.

Likewise, the invention relates to the use of trisodium pyrophosphate in an appetizing agent intended to be used in dry or semi-dry food for domestic animals, and containing at least one flavouring and/or taste factor, in order to improve the palatability of said dry or semi-dry food for domestic animals.

The subject of the invention is also a method for improving the palatability of a dry or semi-dry food for domestic animals, said food including an appetizing agent comprising at least one flavouring and/or taste factor, said method comprising the step of adding trisodium pyrophosphate to said appetizing agent, preferably in a concentration from 5 to 90%, preferably 5 to 80% and more preferably 5 to 70% by weight.

Finally, the invention relates to a method for increasing the appetizing effect of a flavouring or taste factor, comprising the step of combining said flavouring or taste factor with trisodium pyrophosphate, preferably in a concentration from 5 to 90%, preferably 5 to 80% and more preferably 5 to 70% by weight. This flavouring or taste factor is preferably used in the manufacture of a dry or semi-dry food for domestic animals, and in particular for cats.

Preferably, the flavouring or taste factor is combined with the trisodium pyrophosphate before application to a dry or semi-dry cat food.

However, in another embodiment, said trisodium pyrophosphate and said flavouring or taste factor are added sequentially to a dry or semi-dry cat food.

In the particular embodiments of the invention, the trisodium pyrophosphate and the flavouring are used for dry cat food manufactured by extrusion.

The trisodium pyrophosphate and the flavouring are generally applied directly to dry or semi-dry food using dry application methods.

Thus, in the preferred methods of implementing the invention, a trisodium pyrophosphate powder is blended with a powder containing at least one flavouring and/or taste factor and the powder blend is applied to the food.

However, in another method of implementation, trisodium pyrophosphate is blended with a liquid solution containing at least one flavouring and/or taste factor, and the extruded dry pet food is coated with this solution.

The invention also relates to the application of trisodium pyrophosphate to a food already containing a flavouring and/or taste factor, or to the application of trisodium pyrophosphate before the application of a flavouring and/or taste factor. Thus, the trisodium pyrophosphate and flavouring/taste factor may be applied concomitantly or sequentially.

In the conventional ways of implementing the invention, the trisodium pyrophosphate is used on dry and semi-dry food having a moisture content of about 50% or less by weight and representing a nutritionally balanced mixture containing proteins, fibre, glucides and/or starch.

Such mixtures are well known to those skilled in the art, and their composition depends on many factors such as, for example, the desired food balance for the specific type of pet.

In addition to these base elements, the food may include vitamins, minerals and other additives such as seasonings, preservatives, emulsifiers and wetting agents.

The food balance, including the relative proportions of vitamins, minerals, lipids, proteins and carbohydrates, is determined according to the known dietary standards in the veterinary field. For example, the compositional food balance of cat food is determined according to the known dietary conditions for cats.

It is possible to use food having protein sources of all kinds, especially plant proteins such as soya or groundnut, animal proteins such as casein or albumin, and fresh animal tissue, for example fresh meat tissue and fresh fish tissue, or even elements that are dry or made dry such as fish meal, poultry meal, meat meal and bone meal. Other types of suitable proteinaceous materials include wheat gluten or corn gluten, and microbial proteins such as yeast.

Ingredients containing a substantial proportion of starches or carbohydrates are also used, for example corn, milo, alfalfa, wheat, barley, rice, soya husk and other grains having a low protein content.

It is also possible to add, to the food that can be used within the context of the invention, other ingredients such as whey and other milk by-products such as other carbohydrates. Furthermore, known seasonings, including for example corn syrup or molasses, may be added.

As an example, a typical composition well known in the art for a dry cat food composition to which the appetizing agent containing trisodium pyrophosphate is applied may consist (in percentages by weight) of: about 0–70% cereal base such as flour (corn, wheat, barley or rice); about 0–30% animal by-product (poultry or beef); about 0–25% corn gluten; about 0–25% fresh animal tissue, such as poultry, or beef tissue; about 0–25% soya meal; about 0–10% animal fat; about 0–20% seafood base; about 0–25% fresh fish tissue; about 0–10% corn syrup having a high fructose content; about 0–10% dry molasses; about 0–1.5% phosphoric acid; and about 0–1.5% citric acid.

Vitamins and minerals may be added and these include calcium carbonate, potassium chloride, sodium chloride, choline chloride, taurine, zinc oxide, ferrous sulphate, vitamin E, vitamin A, vitamin B12, vitamin D3, riboflavin, niacin, calcium pantothenate, biotin, thiamin mononitrate, copper sulphate, folic acid, pyroxidine hydrochloride, calcium iodate and the menadione sodium bisulphite complex (a source of vitamin K activity).

The trisodium pyrophosphate is generally prepared in powder form. Trisodium pyrophosphate is commercially available in dry and powder form and is combined with other dry ingredients, such as flavourings and/or taste factors.

The expression "flavouring and/or taste factor" is understood to mean an appetizing agent generally used in the pet food industry, that is to say a composition which, added to a food, significantly increases the consumption of this food.

Among flavourings and/or taste factors commonly used, mention may especially be made of poultry liver hydrolysates such as those sold by SPF-Diana (Elven, Morbihan, France) under the numbers VL1009, VP2003 and MP9007, obtained by enzymatic poultry liver hydrolysis with or without a poultry co-product, pasteurization and possible stabilization with phosphoric acid or potassium sorbate, and possible addition of malodextrin if it is desired to dry the products.

There are other flavouring or taste factor manufacturers, for example Bioproduct (Fairlawn, Mo., USA) and AFB (O'Fallon, MI, USA).

In general, the flavourings or taste factors are enzymatic poultry digestion products which may or may not be supplemented with yeast extracts.

In general, the appetizing agent is applied to dry or semi-dry food such as, for example, extruded dry pet food. The appetizing agent may be applied, for example by spraying or powdering, to the food after extrusion and drying.

The following examples are intended to explain certain embodiments of the invention and must therefore not be considered as limiting.

EXAMPLES

Example 1

Application of the Appetizing Agent

The appetizing agent is applied to an extruded dry cat food. The most common application method, used by SPF, was coating, the main steps of which are the following:
preparation of the raw materials (fat and uncoated extruded dry food) and ingredients (phosphoric acid, liquid appetizing agents and powders):
weighing of the raw materials and ingredients,
heating of the fat,
heating of the liquid flavouring(s),
mixing of the liquid flavouring(s) with phosphoric acid;
coating proper:
introduction of the extruded dry food into the actual pilot coater (=heated batch-type fluidizing mixer),
introduction of the liquids into the heated containers,
start-up of the mixing,
spraying (at atmospheric pressure) of the fat onto the extruded dry food with a dose of 6%,
spraying onto the extruded dry food of the liquid flavouring with a dose of 3% or dusting of said food with powder with a dose of 1%, stopping of the mixing, bagging;

storage: the extruded dry food are stored for at least 2 weeks before being tested.

Example 2

Appetence Test 2.1—Principle

The appetence test is based on the postulate whereby the more food consumed, the more appetizing it is.

Individual versus (2 bowls) appetence tests, based on the comparison between two foods, are carried out. One test is performed on a panel of 35 cats and repeated for 2 days.

2.2—Characteristics of the Panel

The SPF panel is made up of 35 cats covering 90% of European cat breeds, thereby being representative of the European population.

2.4—Operating Method of the Test

Identical amounts of food A and food B were weighed out and placed in identical bowls. The amount present in each ration enables the daily requirements to be met;

distribution of the bowls: the bowls are placed in an individual feed trough accessible via a cat flap;

duration of the test: 16 hours.

2.5—Parameters Studied

Measured Parameters:

1st Food Consumed;

amount of each food consumed by the end of the test;

Calculated Parameters:

individual consumption ratio in % (CR)

$CR_A$=consumption of A(g)×100/consumption of A+B (g)

$CR_B$=consumption of B(g)×100/consumption of A+B (g);

⇒Average consumption ratio (ACR)=average of the individual ratios.

2.6—Statistical Analysis

Statistical analysis is used to determine if there is a significant difference between the 2 ratios:

ACR ⇒Student's t-test with 3 error thresholds, namely 10%, 5% and 1%.

Example 3

Comparison Between Food with and without Trisodium Pyrophosphate, with Neither Flavouring nor Taste Factor After applying fat to the extruded dry food, the surface is dusted with 1% of trisodium pyrophosphate and this food is compared with the same extruded dry food coated with fat but with no pyrophosphate.

No significant difference is observed between the two foods.

Conclusion: Trisodium pyrophosphate is not an effective appetizing agent when it is used alone.

Example 4

Comparison Between the Appetence with Flavouring and with and without Trisodium Pyrophosphate 4.1. Compositions Tested Three different formulations are tested: 2 in powder form and 1 in liquid form:

Liquid: mixture called XVL0070 composed of:

| | |
|---|---|
| VL1009 liver hydrolysate: | 90% by weight |
| $Na_3HP_2O_7$: | 10% by weight |

The VL1009 liquid liver hydrolysate is obtained from a mixture of poultry co-product and poultry liver, which is enzymatically hydrolysed and then pasteurized at 85° C. for 30 minutes, stabilized by the addition of phosphoric acid and potassium sorbate, and then BHT is added as antioxidant. It is available from SPF-Diana.

The powdered pyrophosphate is incorporated into this liquid. This liquid obtained is coated onto the extruded dry food.

Powders: mixture 1, called XVP0036 composed of:

| | |
|---|---|
| VP2003 powdered liver hydrolysate: | 70% by weight |
| $Na_3HP_2O_7$: | 30% by weight |

The VP2003 powdered liver hydrolysate is obtained from a liquid liver hydrolysate (cf. above formulation) with no phosphoric acid, to which maltodextrins are added as drying support. The liquid thus obtained is spray-dried. It is available from SPF-Diana.

The powder is mixed with triNa pyrophosphate:

mixture 2, called XMP1004, composed of:

| | |
|---|---|
| MP9007 powdered liver hydrolysate: | 55% by weight |
| $Na_3HP_2O_7$: | 45% by weight |

The MP9007 powdered liver hydrolysate is obtained from a liquid liver hydrolysate (cf. above powder formulation) but with no poultry co-product, to which maltodextrins are added as drying support. The liquid thus obtained is spray-dried. It is available from SPF-Diana.

The powder is mixed with triNa pyrophosphate.

4.2. Results

The flavourings are coated onto extruded dry cat food with a dose of 1% (powders) or 3% (liquid). Two weeks after coating, the extruded dry food is presented to 35 cats in two different bowls and the consumptions of each of the two foods are quantified. These consumptions were statistically analysed using the Student's t-test method.

| | Products tested | Results |
|---|---|---|
| Day 1 | A = 3% VL1009 | Consumption ratio: 22/78 |
| | B = 3% XVL0070 | B – THS |
| Day 2 | A = 3% VL1009 | Consumption ratio: 16/84 |
| | B = 3% XVL0070 | B – THS |

-continued

| | Products tested | Results |
|---|---|---|
| Day 1 | A = 1% VP2003 | Consumption ratio: 35/65 |
| | B = 1% XVP0036 | B – HS |
| Day 2 | A = 1% VP2003 | Consumption ratio: 29/71 |
| | B = 1% XVP0036 | B – THS |
| Day 1 | A = 1% MP9007 | Consumption ratio: 29/71 |
| | B = 1% XMP1004 | B – THS |
| Day 2 | A = 1% MP9007 | Consumption ratio: 16/84 |
| | B = 1% XMP1004 | B – THS |

VL1009: liquid liver hydrolysate; XVL0070: 90% VL1009 + 10% trisodium pyrophosphate;
VP2003: powdered liver hydrolysate; XVP0036: 70% VP2003 + 30% trisodium pyrophosphate;
MP9007: powdered liver hydrolysate; XMP1004: 55% MP9007 + 45% trisodium pyrophosphate.

4.3. Conclusion

The appetizing agents containing trisodium pyrophosphate are therefore significantly more appetizing than the appetizing agents not containing any trisodium pyrophosphate, to within a 1% risk of error.

These results therefore demonstrate that the addition of trisodium pyrophosphate to various flavourings/taste factors in appetizing agents helps to improve the palatability of food presented to cats.

The invention claimed is:

1. A method for the preparation of an appetizing semi-dry, cat food, comprising:
   combining trisodium pyrophosphate with a flavoring and/or a taste factor to prepare an appetizing agent; and
   coating the cat food with the appetizing agent.

2. The method according to claim 1, characterized in that the trisodium pyrophosphate is present in an amount from 5 to 90% by weight in said appetizing agent and, after coating the cat food, the pyrophosphate is present in an amount from 0.01 to 3% by weight of the food.

3. A method for improving the palatability of a dry or semi-dry cat food, comprising the step of applying a composition comprising trisodium pyrophosphate in combination with at least one flavouring and/or taste factor to said dry or semi-dry food.

4. An appetizing agent for dry or semi-dry cat food, comprising trisodium pyrophosphate in combination with at least one flavouring and/or at least one taste factor.

5. An appetizing agent according to claim 4, characterized in that the trisodium pyrophosphate is present in an amount from 5 to 90% by weight in said appetizing agent.

6. A method for improving the palatability of a dry or semi-dry cat food, comprising the step of adding an appetizing agent according to either of claims 4 and 5 to said food in an amount such that the pyrophosphate is present in an amount from 0.01 to 3% by weight of the food.

7. A method for improving the palatability of a dry or semi-dry cat food, said food including an appetizing agent comprising at least one flavouring and/or taste factor, said method comprising the step of adding trisodium pyrophosphate to said food.

8. A method for increasing the appetizing effect of a flavouring or taste factor, comprising the step of combining said flavouring or taste factor with trisodium pyrophosphate, preferably in a concentration from 5 to 90% by weight.

9. A method according to claim 8, in which the flavouring or taste factor is combined with the trisodium pyrophosphate before application to a dry or semi-dry cat food.

10. A method according to claim 8, in which said trisodium pyrophosphate and said flavouring or taste factor are added sequentially to a dry or semi-dry cat food.

11. A method for feeding a cat comprising:
   feeding a cat a dry or semi-dry cat food, wherein the cat food comprises trisodium pyrophosphate in combination with a flavoring and/or a taste factor.

* * * * *